(12) United States Patent
Chen et al.

(10) Patent No.: US 12,147,811 B2
(45) Date of Patent: Nov. 19, 2024

(54) WARP SCHEDULING METHOD FOR ADJUSTING NUMBER OF SCHEDULABLE WARPS BASED ON LOAD/STORE UNIT STALL CYCLE PROPORTION

(71) Applicant: NATIONAL CHENG KUNG UNIVERSITY, Tainan (TW)

(72) Inventors: Chung-ho Chen, Tainan (TW);
Chien-ming Chiu, Tainan (TW);
Yu-hsiang Wang, Tainan (TW)

(*) Notice: Subject to any disclaimer, the term of this patent is extended or adjusted under 35 U.S.C. 154(b) by 697 days.

(21) Appl. No.: 17/227,422

(22) Filed: Apr. 12, 2021

(65) Prior Publication Data

US 2022/0220644 A1 Jul. 14, 2022

(30) Foreign Application Priority Data

Jan. 8, 2021 (TW) .................................. 110100892

(51) Int. Cl.
*G06F 9/38* (2018.01)

(52) U.S. Cl.
CPC .......... *G06F 9/3836* (2013.01); *G06F 9/3851* (2013.01); *G06F 9/3888* (2023.08)

(58) Field of Classification Search
CPC .... G06F 9/3836; G06F 9/3851; G06F 9/3888; G06F 9/4881; G06F 9/3887
See application file for complete search history.

(56) References Cited

U.S. PATENT DOCUMENTS

| 8,701,111 B2 | 4/2014 | Fontenot et al. |
| 2019/0138364 A1 | 5/2019 | Huang |
| 2020/0183597 A1* | 6/2020 | Das ........................ G06F 1/3275 |
| 2020/0379804 A1 | 12/2020 | Dalmia et al. |

FOREIGN PATENT DOCUMENTS

TW 201015440 A 4/2010

OTHER PUBLICATIONS

Chen et al., "Improve GPGPU latency hiding with a hybrid recovery stack and a window based warp scheduling policy", 2012 IEEE 14th International Conference on High Performance Computing and Communications, pp. 1288-1293.*

* cited by examiner

*Primary Examiner* — David J. Huisman

(57) ABSTRACT

A warp scheduling method includes: storing multiple first warps issued to a streaming multiprocessor in an instruction buffer module; marking multiple second warps which are able to be scheduled in the first warps by a schedulable warp indication window, wherein the number of the marked second warps is the size of the schedulable warp indication window; sampling a load/store unit stall cycle in each time interval to obtain a load/store unit stall cycle proportion; comparing the load/store unit stall cycle proportion with a stall cycle threshold value, and adjusting the size of the schedulable warp indication window and determining the second warps according to the comparison result; and issuing the second warps from the instruction buffer module to a processing module for execution.

5 Claims, 6 Drawing Sheets

| example code | | | | | | | | | | | | | | |
|---|---|---|---|---|---|---|---|---|---|---|---|---|---|---|
| 1:load r0 m0 | | | | | | | | | | | | | | |
| 2:load r1 m1 | | W0 | X | | | X | | O | | O | | | | |
| 3:load r2 r0 r1 | system A | W1 | | X | | X | | O | | O | | | | |
| 4:load r3 r4 r5 | | W2 | | | X | | X | | O | | O | | | |
| X – Load op | | | W0 | W0 | W0 | W0 | W0 | W0 | W0 | W0 | W0 | W0 | W0 | W0 |
| O – ALU op | cache | | W1 | W1 | W1 | W1 | W1 | W1 | W1 | W1 | W1 | W1 | W1 | W1 |
| | | | W2 | W2 | W2 | W2 | W2 | W2 | W2 | W2 | W2 | W2 | W2 | W2 |
| | | W0 | X | | | | | | | X | | | O | O |
| | system B | W1 | | X | | | | | | | X | | | |
| | | W2 | | | | X | | | | | | | | |
| | cache | | W0 | ✗ | | W1 | ✗ | | W2 | ✗ | | W0 | ✗ | | W1 |
| | | W0 | X | | | non-schedulable | | | O | | non-schedulable | | | X |
| | system C | W1 | | X | | X | O | | | | non-schedulable | | | |
| | | W2 | | | | non-schedulable | | X | | | X | O | O | |
| | | | W0 | ✗ | | W1 | W1 | W1 | ✗ | | W2 | W2 | W2 | W2 | ✗ |
| | time (cycle) | | 1 | 2 | 3 | 4 | 5 | 6 | 7 | 8 | 9 | 10 | 11 | 12 | 13 |

FIG. 6

WARP SCHEDULING METHOD FOR ADJUSTING NUMBER OF SCHEDULABLE WARPS BASED ON LOAD/STORE UNIT STALL CYCLE PROPORTION

CROSS REFERENCE TO RELATED APPLICATIONS

This application claims priority to Taiwan Application Serial Number 110100892, filed on Jan. 8, 2021, which is herein incorporated by reference in its entirety.

FIELD OF INVENTION

The present disclosure relates to the field of a warp scheduling method, and more particularly to a method for scheduling the warps issued to a stream multiprocessor of a graphics processing unit.

BACKGROUND OF INVENTION

As application programs involving large amounts of parallel data become more and more popular, graph processing units (GPU) with large amount of computing resources are widely used to benefit from such parallel workload. Modern graph processing units employ a large number of multi threads. By using the single instruction multiple thread (SIMT) architecture, the GPU groups the threads into multiple warps, and for each warp, each thread employs one instruction but operates on different data.

Recently, the memory contention is one of the most critical issues to achieve peak performance on GPUs. One of the reasons for the memory contention problem is the lack of sufficient memory resources (e.g., cache memory space and the number of Miss status holding registers (MSHR)) to support such many parallel threads. Another reason is the off-chip memory access stall, which requires an average of 400 to 600 core cycles, is quite a long time and cannot be easily overlapped. In order to improve the latency hiding ability, modern GPUs schedule a large number of parallel threads. For example, Fermi architecture supports 1536 parallel threads in a stream multiprocessor. However, some recent studies have shown that high thread level parallelism (TLP) sometimes makes memory contention more serious. When higher thread level parallelism is provided, the GPU may have better ability of overlapping the waiting time, but the memory system is more likely to be overloaded due to too many data requests. Therefore, how to balance the memory workload and the memory resources is very important.

SUMMARY OF INVENTION

One of the objectives of the present disclosure is to provide a warp scheduling method and a stream multiprocessor of a graphics processing unit using the warp scheduling method to solve the problem of high latency caused by the memory contention.

To achieve the aforementioned objectives, the present disclosure provides a warp scheduling method including steps of: storing a plurality of first warps issued to the stream multiprocessor in an instruction buffer module; marking a plurality of second warps being schedulable in the first warps by a schedulable warp indication window, wherein the number of the marked second warps is a size of the schedulable warp indication window; sampling a load/store unit (LSU) stall cycle at each time interval to obtain an LSU stall cycle proportion; comparing the LSU stall cycle proportion with a stall cycle threshold value, and adjusting the size of the schedulable warp indication window and determining the second warps according to a comparison result, wherein the second warps comprise sequential warps $W_i$–$W(i+n-1)$, wherein "n" is an adjusted size, "i" is a cardinal number of a 1st warp in the second warps, wherein "i" is given by a formula: i=j & (~(n−1)), wherein i≤j≤(i+n−1), and "j" is a cardinal number of a last warp issuing a data request, wherein "i", "j", "n" are binary values, "&" represents a logical AND operation, and "~" represents a logical NOT operation; and issuing the second warps sequentially from the instruction buffer module to a corresponding one of the processing modules for execution.

In some embodiments of the present disclosure, the step of adjusting the size of the schedulable warp indication window according to the comparison result includes steps of: on a condition that the LSU stall cycle proportion is greater than or equal to the stall cycle threshold value, shrinking the size of the schedulable warp indication window; and on a condition that the LSU stall cycle proportion is less than the stall cycle threshold value, enlarging the size of the schedulable warp indication window.

In some embodiments of the present disclosure, the size is enlarged or shrunk by the power of 2.

In some embodiments of the present disclosure, the warp scheduling method further includes steps of: determining whether the size of the schedulable warp indication window is greater than or equal to a size threshold value before a next time interval for sampling the LSU stall cycle; and if the size is greater than or equal to the size threshold value, when the number of a plurality of data requests stored in a miss state holding register (MSHR) is lower than an upper limit and the second warps are all in a state of dependency stall, enlarging the size of the schedulable warp indication window.

In some embodiments of the present disclosure, the second warps include at least one warp that has issued at least one data request in the MSHR.

By the aforementioned warp scheduling method and stream multiprocessor, the load/store unit stall cycle is sampled and compared with the stall cycle threshold value to determine the severity of the memory contention, and the number of the warps that can be scheduled is adaptively adjusted by reducing/increasing the size of the schedulable warp indication window according to the degree of the severity. When the memory contention is serious, the size of the schedulable warp indication window is shrunk to avoid increasing the burden of accessing data from memory. When the memory contention is not serious, the size of the schedulable warp indication window is enlarged to increase the number of the warps to be executed to improve the parallel processing ability of the stream multiprocessor, so as to improve the computing performance of the whole graphics processing unit.

DESCRIPTION OF DRAWINGS

FIG. 6 is a schematic diagram of executing the same warp by the systems with different sizes of cache memory according to some embodiments of the present disclosure.

DETAILED DESCRIPTION OF PREFERRED EMBODIMENTS

Reference will now be made in detail to embodiments of the present disclosure, examples of which are described herein and illustrated in the accompanying drawings.

Figure 1:
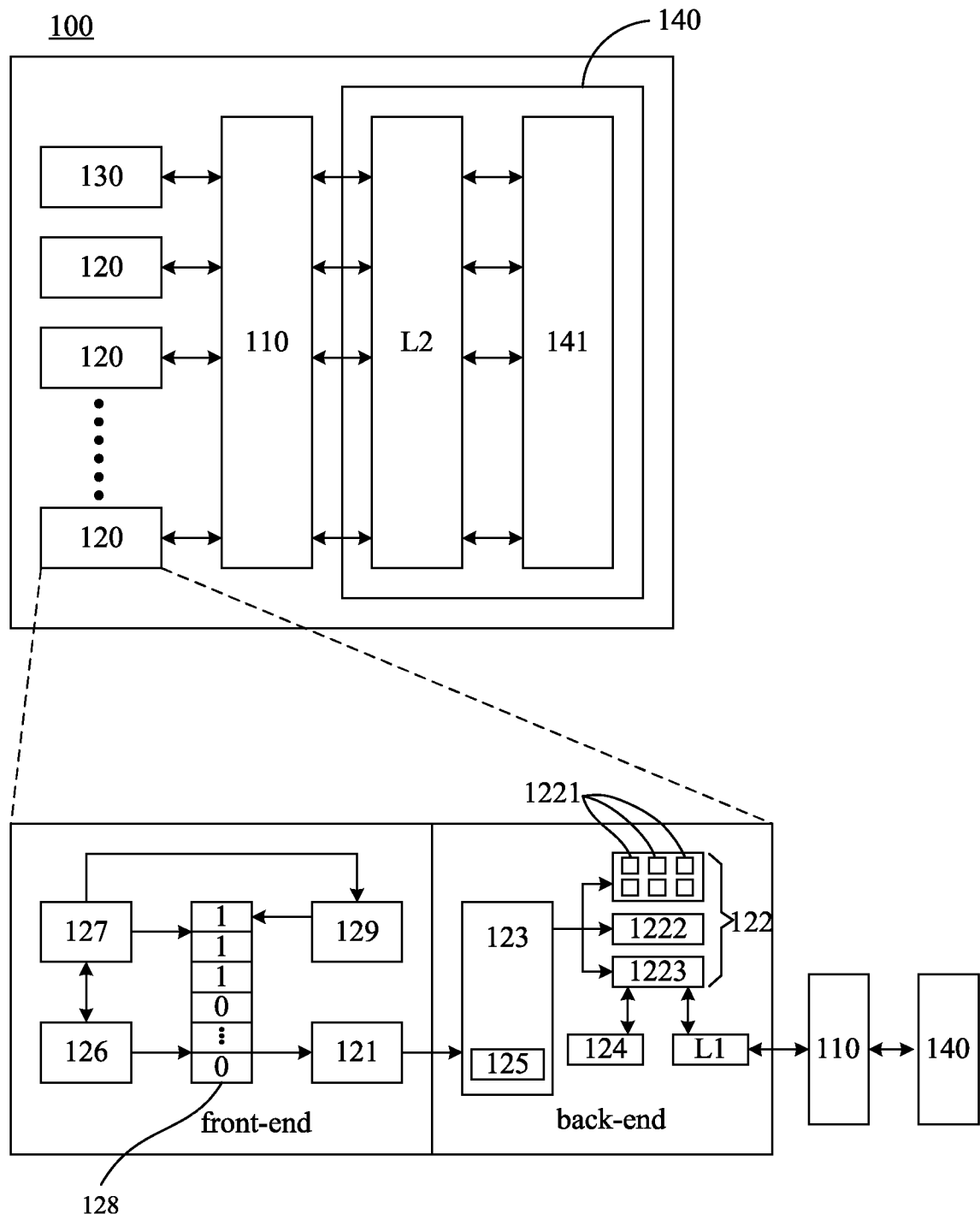
FIG. 1 is a block diagram of a general-purpose graphics processing unit (GPGPU) according to a preferred embodiment of the present disclosure.

Reference is made to FIG. 1. FIG. 1 is a block diagram of a general-purpose graphics processing unit (GPGPU) 100 according to a preferred embodiment of the present disclosure. The GPGPU 100 is a single instruction multiple thread (SIMT) architecture, which includes an interconnection module 110, multiple stream multiprocessors (SMs) 120, a work scheduling module 130, and a memory 140. The interconnection module 110 is electrically connected to each stream multiprocessor 120, the work scheduling module 130, and the memory 140, and is configured to transfer data between these components. The stream multiprocessors 120 are configured to perform computations and execute instructions. The work scheduling module 130 is configured to communicate with an external central processing unit (CPU, not shown in the figure), receive the work assigned by the CPU, and schedule the work to each stream multiprocessor 120 for execution. The memory 140 is provided externally to the stream multiprocessors 120 and is shared by all stream multiprocessors 120 in the GPGPU 100. The memory 140 may include a cache memory L2 and a main memory 141. The data to be processed by the stream multiprocessor 120 can be temporarily stored in the cache L2. If the data to be processed by the stream multiprocessor 120 are not stored in the cache L2, it is further requested to access the data from the main memory 141 and then store the data in the cache L2 for the stream multiprocessor 120 to access and process.

When the CPU issues a new work, the work scheduling module 130 receives the program to be executed in the unit of thread grids, cuts and schedules the program, and then issues the program to each stream multiprocessor 120 in the unit of thread block for execution. The thread block includes multiple warps. After receiving the thread block, the warp scheduling module 121 of the stream multiprocessor 120 schedules the warps in the thread block, and assigns the warps to the corresponding one of the processing modules 122 in order based on the width of single instruction multiple data (SIMD). Each warp includes the same number of threads. The processing module 122 may include a plurality of stream processors (SPs) 1221, a special function unit (SFU) 1222, and a load/store unit (LSU) 1223. The stream processor 1221 is the most basic computation unit, which is configured to perform the basic operations on the threads of the warp. Multiple threads in the same warp are computed simultaneously by multiple stream processors 1221 of the stream multiprocessor 120. For example, if the stream multiprocessor 120 includes 32 stream processors 1221, each warp has 32 threads, and these 32 stream processors 1221 are executed in parallel at the same time. The special function unit 1222 is configured to execute transcendental function instructions, such as sine, cosine, square root, and so on. The load/store unit 1223 is configured to access the data from the cache memory L1 and the shared memory 124 of the stream multiprocessor 120.

Specifically, the data in the shared memory 124 are used only by the stream multiprocessor 120 having the shared memory 124, and other stream multiprocessors 120 are unable to use the shared memory 124 not owned by themselves. The shared memory 124 generally stores a public counter or a common result of the thread block assigned to the streaming multiprocessor 120 having the shared memory 124. The main memory 141 stores all the data to be accessed by the warps. The cache memory L1 is configured to cache the data accessed by the stream multiprocessor 120 having the cache memory L1 from the main memory 141, which are usually the data used by the warps recently, while the cache memory L2 is configured to cache the data accessed by all the stream multiprocessors 120 from the main memory 141. In a word, for access speed, cache L1>cache L2>main memory 141; for size, cache L1<cache L2<main memory 141. When a piece of data is to be calculated, the load/store unit 1223 may first request the data from the cache L1. If the cache L1 has the data, it means "hit", and the data are returned from the cache L1. If the cache memory L1 does not have the data, it means "miss", and then it has to send a data request to the cache memory L2 to confirm whether the cache memory L2 has the data. If not, it continues to request the main memory 141 to access the data.

Moreover, the stream multiprocessor 120 also includes an operand collector 123. The operand collector 123 includes logic operators such as arbitration logic, access logic (not shown in the figure), and so on, as well as a register bank 125, and is configured to ensure that there is no bank conflict in the access to the register bank 125. The register bank 125 includes a plurality of registers for the stream processors 1221 to temporarily store data (e.g., temporarily storing the result of operation), respectively. The register bank 125 also includes a miss status holding register (MSHR) (not shown in the figure), which is a first-in first-out (FIFO) queue to store the requests for accessing data from the cache memory L2. As mentioned previously, when the data to be processed by the warp are not stored in the cache memory L1 (i.e., miss), a data request is sent to the cache memory L2 to confirm whether the cache memory L2 has the data. At the same time, the data request is temporarily stored in the MSHR and queued. The request is not removed from the MSHR until the data are accessed and stored in the cache memory L1. The MSHR has a storage size limit. On the condition that the MSHR is full of the data requests and there is a new data request at this moment, the data request is unable to be stored anymore and a special event is issued.

In some embodiments, if a miss is occurred in the cache memory L1, the miss handling logic may first confirm whether there is a data request for the same data in the MSHR. If there is a data request the same data, this request and the request stored in the MSHR are merged into one request. If not, this data request is newly added.

As mentioned previously, the speed of accessing data from the cache memory L1 is greater than that from the cache memory L2/main memory 141. If the conditions of miss increase, it may cause that the processing module 122 is unable to execute the warp while waiting for data, such that the performance of the entire stream multiprocessor 120 is reduced. Accordingly, the stream multiprocessor 120 provided in the present disclosure further includes a schedulable warp indication window 128 and a window adjusting module 129, and a scheduling method of using the schedulable warp indication window 128 and the window adjusting module 129 to schedule the warps is provided, which is described in detail below.

Figure 2:
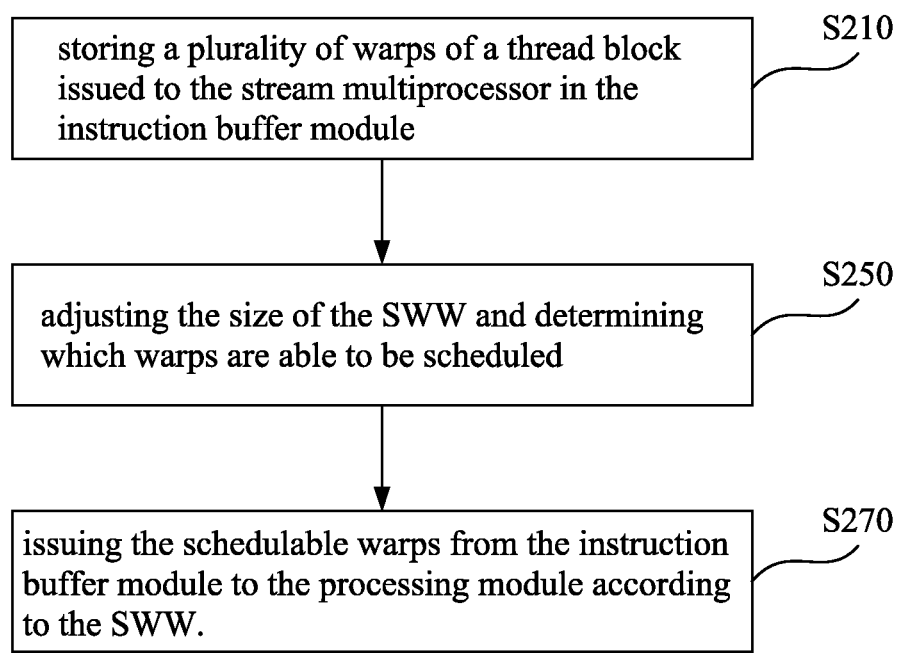
FIG. 2 is a flow chart of a warp scheduling method according to a preferred embodiment of the present disclosure.

Reference is also made to FIG. 2. FIG. 2 is a flow chart of the warp scheduling method according to a preferred embodiment of the present disclosure. It should be understood that the warp scheduling method refers to the scheduling method of assigning multiple warps in the thread block, which is issued to the stream multiprocessor 120, to the processing module 122 of the stream multiprocessor, rather than the scheduling method of assigning the program to each stream multiprocessor in units of thread blocks by the work scheduling module 130. For convenience of understanding, the description is illustrated below with the architecture of FIG. 1.

In step S210, the multiple warps in the thread block issued to the stream multiprocessor 210 are stored in an instruction buffer module 126. Specifically, when the work scheduling module 130 issues the thread block to the stream multiprocessor 210 for execution, the stream multiprocessor 210 fetches the warp to be executed by a fetch module (not shown in the figure), and stores the warp, which is decoded by a decoding module (not shown in the figure), in the instruction buffer module 126. In the present embodiment, the graphics processing unit 100 employs the Fermi-like architecture. Therefore, the number of the warps in the thread block that each stream multiprocessor 120 can process is forty-eight. In other words, the instruction buffer module 126 can store 48 warps W0-W47.

Next, in step S250, the size of a schedulable warp indication window (SWW) 128 is adjusted and the warps that can be scheduled are determined by a window adjusting module 129. The schedulable warp indication window 128 is connected to the instruction buffer module 126, and configured to mark the schedulable warps (e.g., W16-W23) among the assignable warps (e.g., W0-W47) noted by a score module 127 in the instruction buffer module 126. For example, in this case, the schedulable warp indication window 128 may include 48 units used to indicate (mark) which warps among the 48 warps in the instruction buffer module 126 can be scheduled to the back-end processing module for execution. Specifically, the schedulable warp indication window 128 functions as a mask, which masks the warps W0-W47 that can be assigned. Only the schedulable warps W16-W23 marked by the schedulable warp indication window 128 can be issued to the warp scheduling module 121, and the warp scheduling module 121 assigns these warps to the corresponding processing module 122 for execution.

The window adjusting module 129 can adjust the size of the schedulable warp indication window 128 (i.e., the number of schedulable warps) and determine the warps that are schedulable by adjusting the bit value in the unit used to indicate the schedulable warps in the schedulable warp indication window 128. For example, only the warps which are marked with the high logic level (e.g., 1) in the schedulable warp indication window 128 can be scheduled, and the warps which are marked with the low logic level (e.g., 0) in the schedulable warp indication window 128 stop being scheduled for some time. The number of the warps marked with high logical level in the schedulable warp indication window 128 is the size of the schedulable warp indication window 128. How the window adjusting module 129 determines which warps can be scheduled are further described in detail later.

Next, in step S270, the warp scheduling module 121 sequentially assigns the schedulable warps (e.g., W16-W23), which are marked according to the schedulable warp indication window 128, from the instruction buffer module 126 to the stream processors 1221, the special function unit 1222, or the load/store unit 1223 in the processing module 122 for execution. If the warp processes the general operation, the warp scheduling module 121 issues it to the stream processor 1221 for processing. If the warp processes the special function operation, the warp scheduling module 121 issues it to the special function unit 1222 for processing. If the warp processes the data access, the warp scheduling module 121 assigns it to the LSU 1223 for accessing the cache memory L1.

In some embodiments, before the warp scheduling module 121 assigns the schedulable warps (e.g., W16-W23) marked by the schedulable warp indication window 128 to the processing module 122, the scoring module 127 further performs a dependency checking process on the warps stored in the instruction buffer module 126 corresponding to the schedulable warps marked by the schedulable warp indication window 128 (e.g., W16-W23) to confirm that these warps W16-W23 are able to be scheduled. Specifically, the scoring module 127 excludes the warps having the instructions with read-after-write (RAW) hazard or write-after-write (WAW) hazard, since the warps having these instructions may result in dependency stall during execution. If the schedulable warps (e.g., W16-W23) marked by the schedulable warp indication window 128 include the warps with the aforementioned hazards, then the warps with the aforementioned hazards are unable to be assigned by the warp scheduling module 121.

In some embodiments, similarly, the scoring module 127 includes the number of bits corresponding to the number of the warps in the thread block, and each bit corresponds to a warp. When the warp passes the dependency checking process to be assignable, the bit corresponding thereto is noted by the high logic level (e.g., 1). The bit corresponding to the unassignable warp is noted by the low logic level (e.g., 0).

The warp scheduling method of the present disclosure determines the number of the warps that can be scheduled in a certain time interval by adjusting the size of the schedulable warp indication window 128, which can effectively solve the problem of load/store unit (LSU) stall. In brief, on the condition that the memory contention is serious, the number of the schedulable warps is reduced to increase the data locality in the cache memory L1 and avoid too many warps waiting for data. The warp that has obtained the data complete all operations as far as possible before the next warp that obtains the data is executed, so as to avoid requesting data all the time and reduce the waiting time for data, thereby increasing the execution performance of the stream multiprocessor. The details are as follows.

Figure 3:
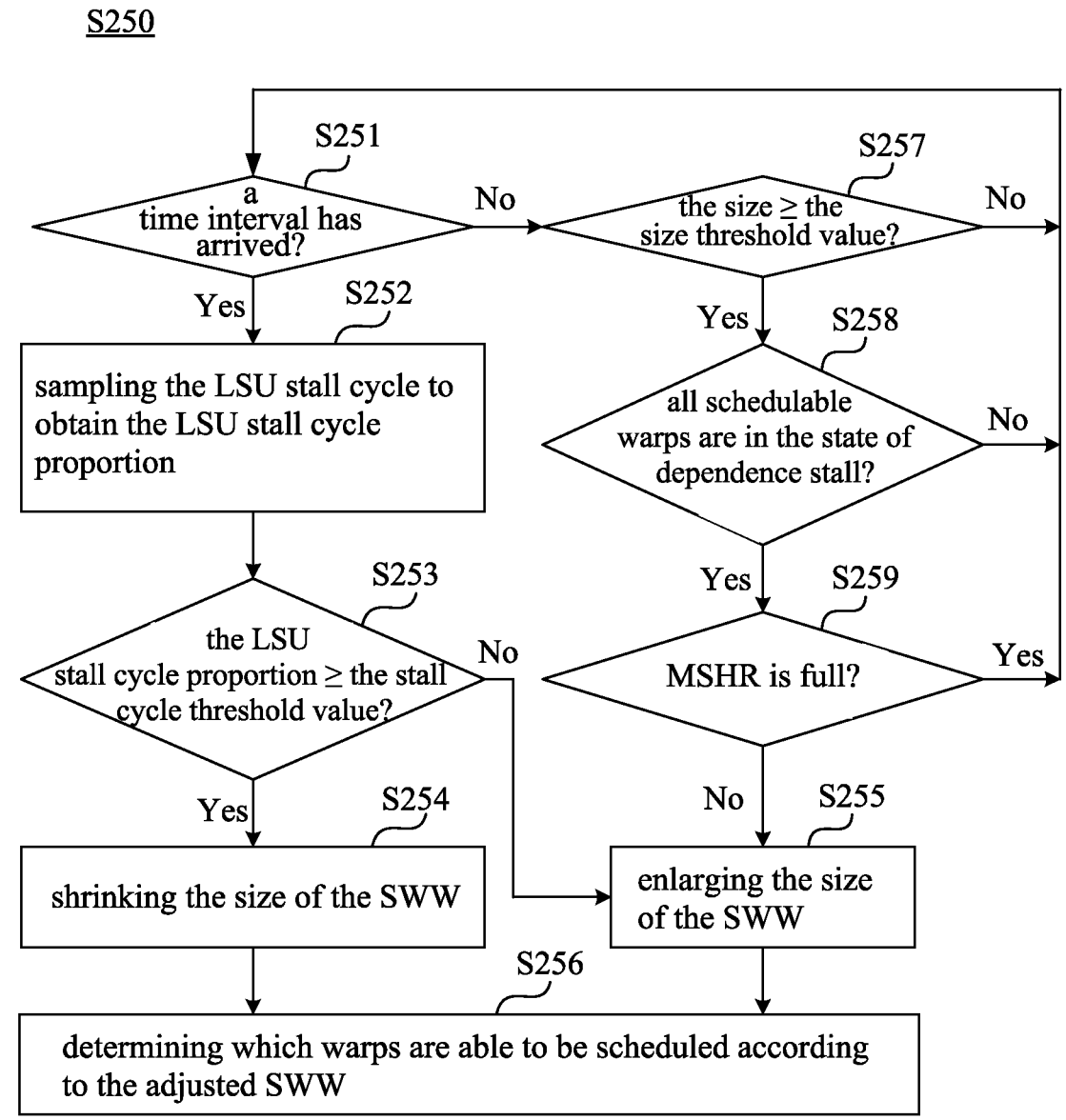
FIG. 3 is a flow chart of step S250 in the warp scheduling method in FIG. 2 according to a preferred embodiment of the present disclosure.

Reference is made to FIG. 3. FIG. 3 is a flow chart of step S250 in the warp scheduling method in FIG. 2 according to a preferred embodiment of the present disclosure. Step S250 further includes steps S251-S259. In step S251, the window adjusting module 129 determines whether the running time of the stream multiprocessor 120 reaches one time interval. If so, step S252 is performed to sample a load/store unit (LSU) stall cycle by the window adjusting module 129 to obtain an LSU stall cycle proportion, and then step S253 is performed to compare the LSU stall cycle proportion with a stall cycle threshold value. In the present embodiment, the window adjusting module 129 may check whether the state machine of the load/store unit (LSU) is stalled in each cycle, and increment the count value of the counter if it is stalled. At each time interval, the window adjusting module 129 accesses the count value of the counter to sample the LSU stall cycle, and divides the sampled LSU stall cycle by the time interval to obtain the LSU stall cycle proportion. The LSU stall cycle proportion is used to be compared with the stall cycle threshold value to determine whether the memory contention is serious in this time interval, and the size of the schedulable warp indication window 128 is adjusted according to the comparison result. In a preferred embodiment, in the Fermi-like architecture, the time interval can be set between 1,000 and 10,000 cycles, in order to avoid the drastic variation of the LSU stall cycle proportion due to too small time intervals (e.g., 100 cycles) and avoid the fact that the sampled LSU stall cycle proportion is unable to exhibit the actual memory contention due to too large time intervals (e.g., 100,000 cycles).

Figure 4:
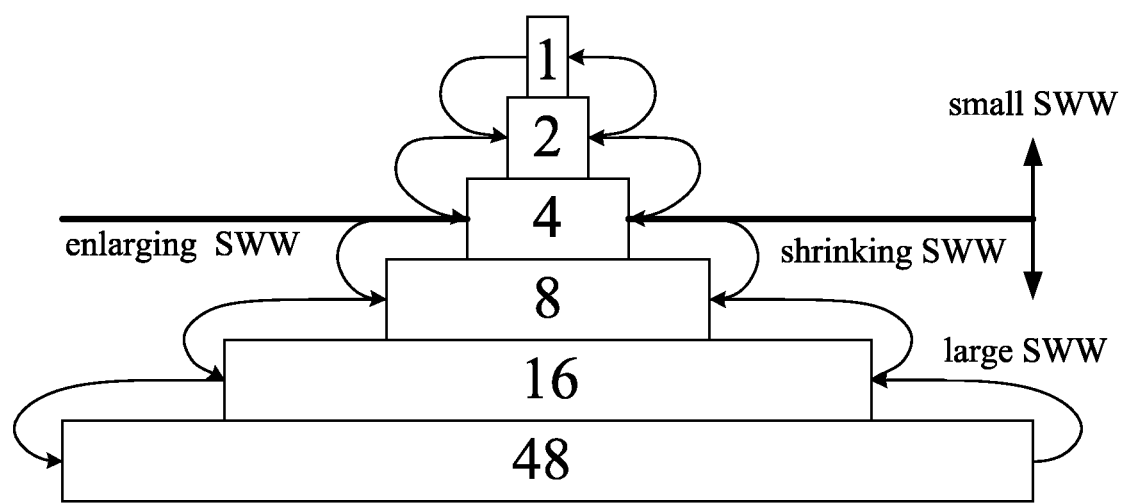
FIG. 4 is a schematic diagram of adjusting the size of the schedulable warp indication window according to some embodiments of the present disclosure.

In step S253, if the LSU stall cycle proportion is greater than or equal to the stall cycle threshold value, it indicates that the memory contention is serious at this moment, then step S254 is performed to shrink the size of the schedulable warp indication window (SWW) 128 by the window adjusting module 129. For example, on the condition that the stream multiprocessor starts running for the first time interval (e.g., after 5,000 cycles), if the LSU stall cycle proportion is greater than or equal to the stall cycle threshold value, the size of schedulable warp indication window 128 can be shrunk from 48 units to 16 units. In other words, the number of the warps that can be scheduled is reduced from 48 to 16 to lower the memory contention. On the condition that the next time interval is reached (e.g., after 10.000 cycles), if the LSU stall cycle proportion is still greater than the stall cycle threshold value, the size of the schedulable warp indication window 128 continues to shrink (e.g., from 16 units to 8 units) until the size of the schedulable warp indication window 128 reaches the lower limit (e.g., 1 unit), as shown in FIG. 4. FIG. 4 is a schematic diagram of adjusting the size of the schedulable warp indication window (SWW) according to some embodiments of the present disclosure.

Since the LSU stall cycle proportion being larger than the stall cycle threshold value means that the memory contention is serious, reducing the number of the schedulable warps can reduce the time for too many warps to wait for accessing data from the memories other than the cache memory L1. Moreover, the warp that processes the same data (e.g., D1) finishes all operations therein as far as possible before executing the warp that processes other data (e.g., D2), which can avoid the occurrence of the following situation: the data D1 originally existing in the cache memory L1, only after completing a certain operation, are replaced by the data D2, so that other warps which will process the data D1 have to send data requests to the cache memory L2/main memory again while those warps are executed.

However, reducing the number of the schedulable warps also lowers the efficiency of parallel processing on the warps by the stream multiprocessor 120. Therefore, in step S253, if the LSU stall cycle proportion is smaller than the stall cycle threshold value, it means that the memory contention is not serious at this moment, then step S255 is performed to enlarge the size of the schedulable warp indication window (SWW) 128 by the window adjusting module 129. For example, the size of the schedulable warp indication window 128 is enlarged from 8 units to 16 units. Similarly, when the enlarged size of the schedulable warp indicates that the window 128 reaches the upper limit (e.g., 48 units), it does not continue to be enlarged. In some embodiments, the size of the schedulable warp indication window 128 is enlarged or shrunk by a power of 2. In this way, the adjustment of the size of the schedulable warp indication window 128 can be achieved simply by the shift operators. For example, by shifting one bit to the right, the size of the schedulable warp indication window 128 can be reduced to half, while by shifting one bit to the left, the size of the schedulable warp indication window 128 can be doubled.

After shrinking the size of the schedulable warp indication window 128 in step S254 or enlarging the size of the schedulable warp indication window 128 in step S255, step S256 is performed to determine which warps can be scheduled by the window adjusting module 129 according to the size of the adjusted schedulable warp indication window 128. In some embodiments, the schedulable warps include at least one warp which has issued the data request. In a preferred embodiment, the schedulable warps include the last warp that has issued the data request, that is, the warp that issues the data request which is last stored in the MSHR queue. For each warp that has issued the data request, the system certainly returns the requested data to the cache memory L1 at last. If the warp that needs the data is removed from the schedulable options and other warps do not need to process the data, this data access time is wasted. Therefore, when determining the warps that can be scheduled, the window adjusting module 129 may be informed of which warps have issued the requests at the present stage according to the data requests stored in the MSHR, and determine the warps to be scheduled in sequence based on one of these warps.

In some embodiments, the window adjusting module 129 determines the cardinal number of the warp that can be scheduled according to the following logical expression, and determines the warps that can be scheduled according to the size of the schedulable warp indication window 128.

$$i=j\&(\sim(n-1)),$$

wherein $i \leq j \leq (i+n-1)$, "i", "j", and "n" are expressed by binary, "i" is a cardinal number of the 1st warp among the warps that can be scheduled, "j" is a cardinal number of the last warp issuing the data request, and "n" is the adjusted size.

Figure 5A:
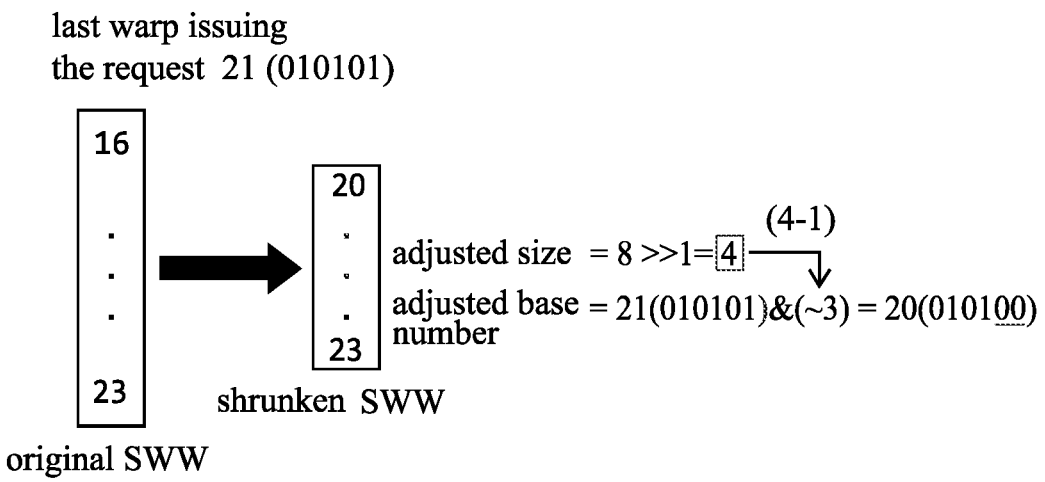
FIG. 5A is a schematic diagram of determining the warp that can be scheduled on the condition that the size is shrunk according to some embodiments of the present disclosure.
Figure 5B:
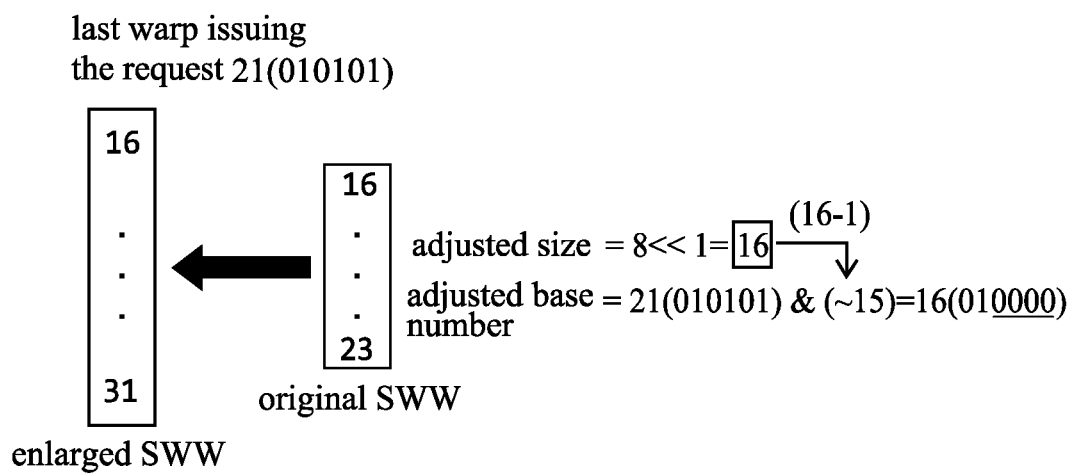
FIG. 5B is a schematic diagram of determining the warps that can be scheduled on the condition that the size is enlarged according to some embodiments of the present disclosure.

Reference is made to FIG. 5A in conjunction with FIG. 5B. FIG. 5A is a schematic diagram of determining the warp that can be scheduled on the condition that the size is shrunk according to some embodiments of the present disclosure, and FIG. 5B is a schematic diagram of determining the warps that can be scheduled on the condition that the size is enlarged according to some embodiments of the present disclosure. It should be noted that for convenience of understanding, the number itself is expressed by decimal, and the number in the bracket behind the number is the corresponding binary representation. As shown in FIG. 5A, it is assumed that the size of the schedulable warp indication window 128 is reduced from 8 units to 4 units, and the window adjusting module 129 is informed of that the last warp issuing the data request is the $22^{nd}$ warp W21 among the warps W0-W47, of which the cardinal number is 21. Firstly, the size of the schedulable warp indication window 128 can be shifted right by 1 bit by the window adjusting module 129 to reduce the size from the original 8 (000100) units to 4 (000010) units. Next, the adjusted size n=4 is subtracted by 1 to get 3 (000011), and then NOT operation is performed on 3 (000011) to get (111100). Finally, by performing AND operation on the obtained (111100) and the cardinal number 21 (010101) of the last warp issuing the data request, the cardinal number of the schedulable warp is (010100)=20, that is, the 21$^{st}$ warp W20. After obtaining the cardinal number, the warps in order according to the adjusted size are W20, W21, W22, and W23. These four warps are the warps that the warp scheduling module 121 can schedule and include the last warp W21 that issues the data request.

Reference is made to FIG. 5B, which is the case when the size of the schedulable warp indication window 128 is enlarged. It is assumed that the size of the schedulable warp indication window 128 is increased from 8 units to 16 units, and the last warp issuing the data request is the warp W21. Similarly, the size of the schedulable warp indication window 128 can be shifted left by 1 bit by the window adjusting module 129 to increase the size from the original 8 (000100) units to 16 (001000) units. Next, the adjusted size n=16 is subtracted by 1 to get 15 (001111), and then NOT operation is performed on 15 (001111) to get (110000). Finally, by performing AND operation on the obtained (110000) and the cardinal number 21 (010101) of the last warp issuing the data request, the cardinal number of the schedulable warp is (010000)=16, that is, the 17th warp W16. After obtaining the cardinal number, the warps in order according to the adjusted size are W16, W17, . . . , W21, . . . , W30, and W31. These sixteen warps are the warps that the warp scheduling module 121 can schedule and also include the last warp W21 that issues the data request.

By the aforementioned logic expression, the adjusted warp that can be scheduled must include at least one warp that has issued the data request. Moreover, this method only uses shift operation, subtraction operation, NOT operation and AND operation, which are basic logic operations and can be completed by only a few logic gates, and thus the hardware cost of implementing the window adjusting module 129 is reduced.

Return to step S251 in FIG. 3. When the window adjusting module 129 determines that the running time of the stream multiprocessor 120 has not reached one time interval, step S257 is performed to determine whether the size of the schedulable warp indication window 128 is greater than or equal to a size threshold value by the window adjusting module 129. If the size of the schedulable warp indication window 128 is smaller than the size threshold value, return to step S251. If the size is greater than or equal to the size threshold value, step S258 is performed to determine whether all the schedulable warps marked by the schedulable warp indication window 128 are in the state of dependency stall by the window adjusting module 129. If not, return to step S251. If so, step S259 is performed to determine whether the MSHR is full by the window adjusting module 129. If not, return to step S251. If the MSHR is not full, it indicates that the MSHR still can receive other data requests, then step S255 is performed. In other words, the window adjusting module 129 can directly enlarge the size of the schedulable warp indication window 128 when the running time has not reached the next time interval (i.e., during the time interval).

In the present disclosure, the size of the schedulable warp indication window 128 can indicate the severity of the memory contention. In the Fermi-like architecture of the present embodiment, the size threshold is set as 8 units. If the size of the schedulable warp indication window 128 is greater than or equal to 8 units (i.e., 8, 16, or 48 units), it represents a large size; and if it is smaller than 8 units (i.e., 1, 2, or 4 units), it represents a small size. For the large size, it represents that the memory contention is not serious. Therefore, if the schedulable warps marked by the schedulable warp indication window 128 are all in the state of dependence stall and the MSHR is still able to receive other data request (i.e., the MSHR is not full), then the window adjusting module 129 can directly enlarge the size of the schedulable warp indication window 128 when the running time has not reached the next time interval to increase the number of the schedulable warps, so as to enhance the performance of the stream multiprocessor.

For the small size, it means that the memory contention is serious. Even if there are only eight warps, the memory is still unable to meet their data requests. This usually occurs when an instruction that loads from the main memory needs to load data from multiple memories, such as matrix operation, image processing, or machine learning. In this case, even if the MSHR is able to store other data requests, the window adjusting module 129 still does not enlarge the size of the schedulable warp indication window 128 until the next time interval is reached, so as to avoid increasing the burden of memory.

Reference is made to FIG. 6. FIG. 6 is a schematic diagram of executing the same warp by the systems with different sizes of cache memory according to some embodiments of the present disclosure. The system A has the unlimited cache memory space and uses the general warp scheduling method. The system B has 1-unit of the cache memory space and uses the general warp scheduling method. The system C has 1-unit of the cache memory space and uses the warp scheduling method of the present disclosure. The three systems all execute the same warps W0-W2, where "X" represents the load instruction and "O" represents the arithmetic logic (ALU) instruction. In this example, if the cache memory misses, two cycles of waiting time for data are required.

As shown in FIG. 6, since the system A has the unlimited cache memory space, the cache memory stores the data to be processed by the warps W0-W2. In this way, when executing each of the load instructions and ALU instructions in the warp W0-W2, the cache hits occur, and thus it is unnecessary to wait for the time of returning data, and the completion time of the whole program (12 instructions) is 12 cycles.

The system B has 1-unit of the cache memory space, and it is assumed that the data to be processed by the warp W0 is stored therein initially. At t=1, the first load instruction of the warp W0 is executed, and the cache hit occurs. Therefore, the operation of this instruction can be completed in 1 cycle. At t=2, the first load instruction of the warp W1 is executed. Since the cache stores the data to be processed by the warp W0, the cache miss occurs. At this moment, it is required to send a data request to the external cache (e.g., the cache memory L2) or the main memory for accessing the data, which requires 2 cycles. Since the system B has 1-unit of the cache memory space, the returned data to be processed by the warp W1 substitutes for the data to be processed by the warp W0 stored originally in the cache. Therefore, it takes 3 cycles to complete the first load instruction of the warp W1, and the cache memory stores the data to be processed by the warp W1. Next, at t=5, the first load instruction of the warp W2 is executed. However, since the cache stores the data to be processed by the warp W1 at this moment, the cache miss still occurs, resulting in the same situation as executing the warp W1. At t=8, it returns back to the second load instruction of the warp W0, but the data to be processed by the warp W0 is no longer in the cache memory (in this case, it stores the data to be processed by the warp W2 at this time). Therefore, the cache miss occurs, and it continues to repeat the above data request process. Accordingly, during 13 cycles, the system B only completes 7 instructions, and 6 cycles are wasted. Compared with the system A, the system A completes 12 instructions in 12 cycles.

The system C also has 1-unit of the cache memory space, but it uses the warp scheduling method of the present disclosure. It is assumed that the LSU stall cycle is sampled per 3 cycles. At t=1, the first load instruction of the warp W0 is executed, and the cache hit occurs. Meanwhile, the window adjusting module 129 samples the LSU stall cycle and determines not to shrink the size of the schedulable warp indication window. At t=2, the first load instruction of the warp W1 is executed, and the cache miss occurs]. At t=4, since the next time interval is reached, the window adjusting module 129 samples the LSU stall cycle again, and determines to shrink the size of the schedulable warp indication window (due to waiting for returning data caused by the cache miss, and the details of the determination are as described previously). In this example, the size of the schedulable warp indication window is reduced to 1-unit, and only the warp W1 issuing the data request is retained. Only the warp W1 is schedulable before reaching the next time interval (i.e., at t=7). At t=4, the data to be processed by the warp W1 has been returned and stored in the cache memory. At t=5, since only the warp W1 can be scheduled, the second load instruction of the warp W1 is executed and the cache hit occurs, and only one cycle is required to complete this instruction. At t=6, still only the warp W1 can be scheduled, and thus the first ALU instruction of the warp W1 is executed. Since the data is already stored in the register at this moment, it is unnecessary to access the cache memory and only one cycle is required to complete this instruction. At t=7, the window adjusting module 129 samples the LSU stall cycle again and determines to enlarge the size of the schedulable warp indication window (since there is no cache miss, the warp W1 is completed in 1 cycle without stall). At this moment, the size of the schedulable warp indication window is increased to 3 units. At this time, the first load instruction of the warp W2 is executed in order, and the cache miss occurs. Therefore, the warp W2 sends a data request. While waiting for returning data, since the fourth instruction of the warp W1 is the ALU instruction, its data has been loaded from the cache and stored in the register and it is unnecessary to load any more. Therefore, this instruction is completed at t=8. At t=10, the window adjusting module 129 samples the LSU stall cycle again and determines to shrink the size of the schedulable warp indication window (due to the cache miss), and only the last warp W2 that has issued the data request is schedulable. The operations after t=11 are the same as the above operations and thus are not described again.

As can be seen from the above example, although the system C has only 1-unit of the cache memory as the same as the system B, the system C completes 9 instructions and wastes only 3 cycles during 12 cycles. Therefore, in the case of the limited resources, it can effectively reduce the impact of the memory contention and further enhance the execution performance of the stream multiprocessor.

To sum up, the warp scheduling method provided by the present disclosure uses the LSU stall cycle and compares the LSU stall cycle proportion with the threshold value to determine the severity of the memory contention, and adaptively adjusts the number of the schedulable warps by shrinking/enlarging the size of the schedulable warp indication window according to the different severities. When the memory contention is serious, the size of the schedulable warp indication window is shrunk to avoid increasing the burden of accessing data from memory. When the memory contention is not serious, the size of the schedulable warp indication window is enlarged and the number of the warps is increased to improve the parallel processing ability of the stream multiprocessor, so as to improve the computing performance of the whole graphics processing unit.

In view of the above, although the present disclosure has been disclosed by way of preferred embodiments, the above preferred embodiments are not intended to limit the present disclosure, and one of ordinary skill in the art, without departing from the spirit and scope of the invention, the scope of protection of the present disclosure is defined by the scope of the claims.

What is claimed is:

1. A warp scheduling method adapted in a stream multiprocessor of a graphics processing unit, the stream multiprocessor comprising a plurality of processing modules, the method comprising steps of:
   storing a plurality of first warps issued to the stream multiprocessor in an instruction buffer module;
   marking a plurality of second warps being schedulable in the first warps by a schedulable warp indication window, wherein a number of the marked second warps is a size of the schedulable warp indication window;
   sampling a load/store unit (LSU) stall cycle at each time interval to obtain an LSU stall cycle proportion;
   comparing the LSU stall cycle proportion with a stall cycle threshold value, and adjusting the size of the schedulable warp indication window and determining the second warps according to a comparison result, wherein the second warps comprise sequential warps Wi–W(i+n−1), wherein "n" is an adjusted size, "i" is a cardinal number of a $1^{st}$ warp in the second warps, wherein "i" is given by a formula: i=j & (~(n−1)), wherein i≤j≤(i+n−1), and "j" is a cardinal number of a last warp issuing a data request, wherein "i", "j", "n" are binary values, "&" represents a logical AND operation, and "~" represents a logical NOT operation; and
   issuing the second warps sequentially from the instruction buffer module to a corresponding one of the processing modules for execution.

2. The warp scheduling method of claim 1, wherein the step of adjusting the size of the schedulable warp indication window according to the comparison result comprises steps of:
   on a condition that the LSU stall cycle proportion is greater than or equal to the stall cycle threshold value, shrinking the size of the schedulable warp indication window; and
   on a condition that the LSU stall cycle proportion is less than the stall cycle threshold value, enlarging the size of the schedulable warp indication window.

3. The warp scheduling method of claim 2, wherein the size is enlarged or shrunk by the power of 2.

4. The warp scheduling method of claim 1, further comprising steps of:
   determining whether the size of the schedulable warp indication window is greater than or equal to a size threshold value before a next time interval for sampling the LSU stall cycle; and
   if the size is greater than or equal to the size threshold value, when a number of a plurality of data requests stored in a miss state holding register (MSHR) is lower than an upper limit and the second warps are all in a state of dependency stall, enlarging the size of the schedulable warp indication window.

5. The warp scheduling method of claim 4, wherein the second warps comprise at least one warp that has issued at least one data request in the MSHR.

* * * * *